Figure 1:
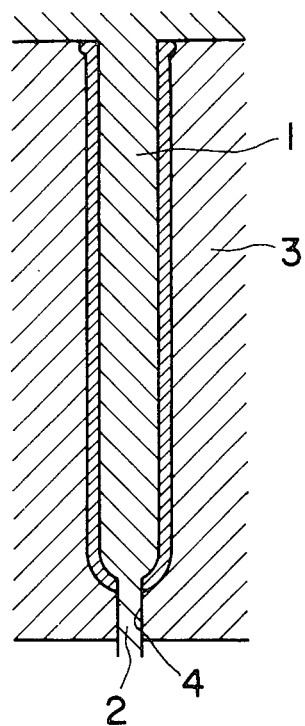

United States Patent [19]

Suzuki

[11] 4,347,209

[45] Aug. 31, 1982

[54] METHOD FOR MOLDING ELONGATED PARISONS

[75] Inventor: Sadao Suzuki, Tokyo, Japan

[73] Assignee: Yoshino Kogyosho Co., Ltd., Japan

[21] Appl. No.: 211,855

[22] Filed: Dec. 1, 1980

Related U.S. Application Data

[63] Continuation of Ser. No. 58,777, Jul. 19, 1979, abandoned.

[51] Int. Cl.³ .............................................. B29D 3/00
[52] U.S. Cl. .................................... 264/250; 264/245; 264/251; 264/255; 264/537
[58] Field of Search ............... 264/250, 251, 255, 245, 264/537

[56] References Cited

U.S. PATENT DOCUMENTS

| | | | |
|---|---|---|---|
| 3,822,332 | 7/1974 | Hrach | 264/537 |
| 3,950,483 | 4/1976 | Spier | 264/245 |
| 4,035,466 | 7/1977 | Langecker | 264/255 |
| 4,052,497 | 10/1977 | Monnet | 264/255 |
| 4,150,088 | 4/1979 | Chang | 264/328 |
| 4,157,883 | 6/1979 | Mares | 264/255 |

*Primary Examiner*—Paul R. Michl
*Attorney, Agent, or Firm*—Fidelman, Wolffe & Waldron

[57] ABSTRACT

A method for injection molding a particularly elongated tubular parison having a closed bottom and assuring consistently uniform wall thickness in the tube wall, is disclosed. The method involves injection molding an open bottom tubular member, and thereafter forming a bottom wall integrally with the tubular member in a separate injection molding step in which a molten polymer is injected into a mold cavity defined, in part, by the bottom end of the tubular member. During the first injection molding step, the core mold is held at both ends by the other components of the mold assembly so that there is no possibility of eccentric misplacement of the elongated core in the mold cavity due to flexing of the core, which would cause non-uniformity in wall thickness of the molded tube. The open bottom of the tube is closed by injecting additional polymer during the second injection molding step, wherein a portion of the mold cavity is defined by the bottom end of the previously formed tubular member, so that the injection molded bottom wall is integrated to the tube parison in accurate relative position to the tubular wall.

2 Claims, 8 Drawing Figures

METHOD FOR MOLDING ELONGATED PARISONS

This is a continuation of application Ser. No. 058,777, filed July 19, 1979, now abandoned.

This invention relates to a method for injection molding an elongated parison of polyethylene terephthalate to be blow molded into a biaxially stretched, bottle shaped container.

Polyethylene terephthalate has come into widespread use because of a number of characteristics and durability. Most of the highly desirable characteristics and durability of the polymer are obtained when the polyethylene terephthalate article is biaxially stretched. Therefore, it is common practice to produce shaped articles of polyethylene terephthalate through an injection blow molding process.

A typical injection blow molding process includes injection molding an elongated, bottom closed tubular parison as a primary product, axially stretching the parison by means of a pin stretcher, and introducing a pressurized fluid into the parison.

The parison is usually of a plain tube configuration similar to a chemical test tube, closed at its bottom end. Because of the simple tubular configuration, the parison is injection molded using a relatively uncomplicated mold assembly. However, consistently uniform wall thickness is needed for the tubular wall of the parison, and this requires extremely accurate relative positioning of the core mold in the mold cavity.

In case of injection molding a relatively large diameter parison, the core mold may be of sufficient inherent mechanical strength to avoid flexing thereof during the polymer injection, or may be substantially insensitive to relatively small displacement in the mold cavity. By contrast, in producing an elongated parison with relatively small diameter, the core may be of undesirably small diameter in view of its axial length, and thus tend to flex by injection pressure of the polymer or vibration caused in the molding machine, to such an extent as to cause noticeable variation in tube wall thickness particularly near the bottom end of the parison. Particularly in a multi-mold injection molding machine, it is difficult to position the number of individual elongated core molds accurately in the respective mold cavities. Further, a substantial vibration occurs in the molding machine when the heavy weight, multi-mold unit is moved during the mold opening and closing operation. Such vibration would cause undesired displacement of the cores in the cavities, producing considerable thickness variations near the bottom end of the parison.

It is therefore a primary object of the present invention to provide a method for forming an elongated parison with uniform tube wall thickness.

Another object of the present invention is to provide a method in which such elongated parison is produced through a simplified two-step injection molding process.

A still another object of the present invention is to provide a method in which the free end of an elongated core is firmly held in position by a portion of the mold during the first step of a two-step injection molding process, thereby reducing strength requirement for the core and associated supporting mechanism.

Figure 2:
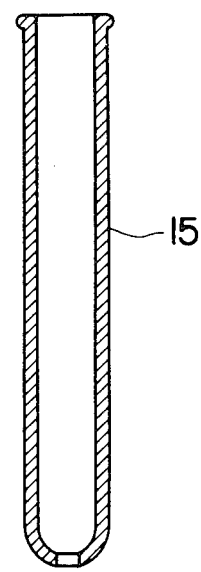
Figure 3:
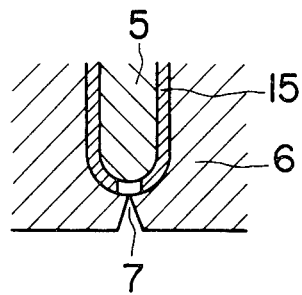
Figure 4:
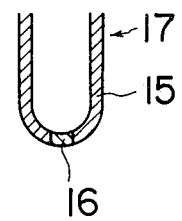
Figure 5:
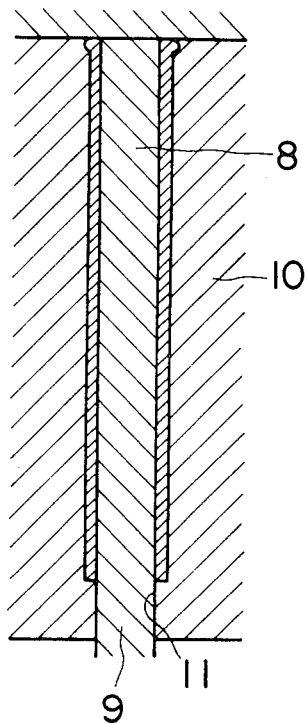
Figure 6:
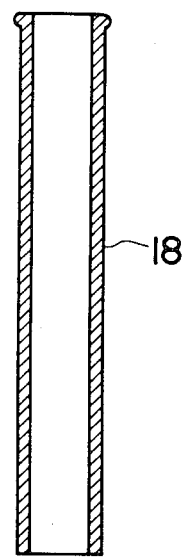
Figure 7:
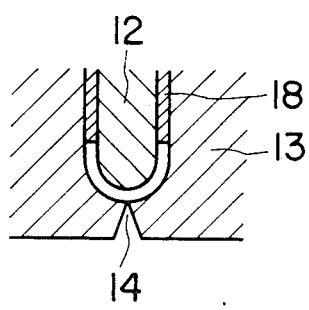
Figure 8:
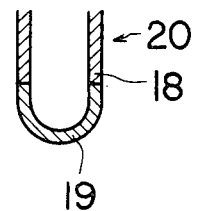

Other objects and advantages will become apparent from the following description taken in conjunction with the drawings, wherein:

FIGS. 1 to 4 illustrate a preferred embodiment of the process according to the present invention, FIG. 1 showing a vertical cross sectional view of a first set of a core and a mold cavity employed for molding an open bottom parison; FIG. 2 showing a vertical cross section of the open bottom parison formed using the combination of FIG. 1; FIG. 3 showing a fragmentary cross sectional view of a second mold assembly for molding a bottom parison wall, using the bottom end of the open bottom parison to define a portion of the mold cavity, and FIG. 4 showing a fragmentary cross section of a completed closed bottom parison; and FIGS. 5 to 8 illustrate another embodiment of the present invention; FIG. 5 showing a vertical cross section of a modified combination of core and mold cavity used in a first injection step; FIG. 6 showing a vertical cross-section of an open bottom tubular parison formed by using the combination of FIG. 5, FIG. 7 showing a fragmentary cross sectional view of a second mold assembly used for molding a bottom parison wall, using the bottom end of the open bottom parison to define a portion of the mold cavity, and FIG. 8 showing a fragmentary cross section of a completed, closed bottom parison.

Referring to the drawings, an elongated core (1 or 8) is supported at its bottom end by a portion of the mold unit defining a mold cavity (3 or 10). A molten polymer is injected into the hollow space defined around the core to form an open bottom parison (15 or 18) which is then placed in another mold assembly where the open bottom of the parison (15 or 18) is used to define a port of the mold cavity. Additional molten polymer is introduced into the mold cavity to form a bottom wall (16 or 19) integrally with the previously formed tube wall, the resulting completed parison being indicated by numeral (17 or 20).

The apparatus employed in practicing the method of the present invention, comprises a first set of a core (1 or 8) and a mold unit defining a mold cavity (3 or 10) to which the core is to be inserted for the injection molding of the open bottom parison (15 or 18) described, and a second set of a core (5 or 12) and a mold unit defining a mold cavity (6 or 13) with the bottom end of the open bottom parison placed between the core and the mold unit for the injection molding of the bottom wall (16 or 19) integrally with the previously formed parison wall.

Referring to FIGS. 1 to 4, a preferred embodiment of the present invention is shown wherein a first set of a core and a mold unit are shaped and arranged to define a parison cavity having a relatively small bottom aperture through which a stem or reduced diameter end portion (2) of the core (1) is extended to be fitted into an opening (4) formed in the bottom of the mold unit.

In this manner, the core (1) is firmly retained in the desired accurate position relative to the hollow cavity of the mold unit during the injection of the polymer into the parison cavity. Thus flexing or shifting of the core (1) because of the injection pressure or vibration of the machine is avoided, and thus uniform wall thickness is assured in the molded, open bottom parison (15).

The parison (15) is then placed between a second core (5) and a second mold unit (6), and a molten polymer is injected to the cavity defined beneath the bottom opening of the parison, through a gate (7), to form a bottom wall (16). During the second injection process, the tubular parison wall is retained in position by the core and the mold unit against the injection pressure.

FIGS. 5 to 8 illustrate an alternative embodiment of the present invention, in which a complete semi-spherical bottom wall (19) is formed during the second injection step. In the first injection step, a plain tube parison (18) is injection molded using a core (8) and a mold unit (10). The tube parison is then placed between a second core (12) and a second unit (13), and additional polymer is injected into the hollow space (13) defined by bottom portions of the core (12) and mold unit (13) and the bottom end of the tube parison, through a gate (14), thus forming a semi-spherical bottom wall (19), a completed, closed bottom parison being designated by numeral (20).

The second embodiment illustrated in FIGS. 5 to 8 has advantages over the first mentioned embodiment shown in FIGS. 1 to 4, in that the first core (8) used in the second embodiment is of a plain cylindrical configuration throughout the axial length including the end portion (9) to be inserted into the opening (11) of the mold unit, and this results in a more simplified mold construction for the first injection step.

The mold unit (3 or 10) used in the first step may be provided with a gate opening to the bottom end of the parison cavity (15 or 18) so that after the second injection step, the completed parison (17 or 20) is free of gate mark except at the bottom wall, although the position of the gate is not limited to any specific point of the tube cavity.

According to the method of the present invention, during the first injection step, the free end of the core (1 or 8) is restrained from any displacement within the mold cavity by fitting into the opening (4 or 11) of the mold unit (3 or 10), thereby assuring uniformity in wall thickness of the tube wall of the injection molded parison.

Also, the bottom wall (16 or 19) formed integrally with the tube parison wall (15 or 18) in the second injection step is substantially free from undesired thickness variation because the tube parison in firmly clamped between the second core (5 or 12) and its mating mold unit (6 or 13) to avoid displacement of the parison wall with respect to the second set mold cavity.

The bottom wall (16 or 19) is formed from the same polyethylene terephthalate as the open bottom parison wall (15 or 18), and thus forms a perfect, integral bonding with the bottom end of the previously formed parison wall (15 or 18).

From the foregoing description, it should be readily understood that a method has been described which produces an elongated parison with consistently uniform wall thickness, without requiring a complicated manufacturing operation.

What is claimed is:

1. A method for injection molding an elongated, closed bottom polymer parison to be blow molded into a final biaxially-stretched shape; comprising the steps of injection molding an open bottom parison by introducing molten polymer into a tubular mold cavity defined by a first set of a core and a mold unit having an end of the core thereof extending into said mold unit, such that at least a portion of said core is capable of eccentric movement within said mold unit so as to cause non-uniform wall thickness of said parison when not firmly retained from movement within said mold unit, an end portion of said end extending into and retained in an opening in said mold unit so as to prevent eccentric movement of said core within said mold unit, and thereafter injection molding a bottom wall integrally with said open bottom parison to form said closed bottom parison by introducing molten polymer into a second mold cavity defined by a second set of a core and a mold unit and the open bottom of said open bottom parison clamped between said second set core and mold unit, whereby the closed bottom parison has substantially uniformly thin walls.

2. The method as defined in claim 1, wherein the polymer is polyethylene terephthalate.

* * * * *